(12) United States Patent
Bunce et al.

(10) Patent No.: US 7,893,182 B2
(45) Date of Patent: Feb. 22, 2011

(54) MANUFACTURE OF RESINS

(75) Inventors: Timothy Rex Bunce, Vale of Glamorgan (GB); Bhukandas Parbhoo, Sully (GB); Pierre Chevalier, Brussels (BE)

(73) Assignee: Dow Corning Corporation, Midland, MI (US)

( * ) Notice: Subject to any disclaimer, the term of this patent is extended or adjusted under 35 U.S.C. 154(b) by 1024 days.

(21) Appl. No.: 10/575,920

(22) PCT Filed: Oct. 8, 2004

(86) PCT No.: PCT/EP2004/011610
§ 371 (c)(1),
(2), (4) Date: Feb. 2, 2007

(87) PCT Pub. No.: WO2005/039752
PCT Pub. Date: May 6, 2005

(65) Prior Publication Data
US 2007/0125998 A1 Jun. 7, 2007

(30) Foreign Application Priority Data

| Oct. 15, 2003 | (GB) | ................................. | 0324143.7 |
| Oct. 15, 2003 | (GB) | ................................. | 0324147.8 |
| Feb. 12, 2004 | (GB) | ................................. | 0403132.4 |

(51) Int. Cl.
*C08G 77/00* (2006.01)
(52) U.S. Cl. .......................... 528/10; 423/337; 423/345
(58) Field of Classification Search .................... 528/10
See application file for complete search history.

(56) References Cited

U.S. PATENT DOCUMENTS

| 5,234,723 | A | 8/1993 | Babacz |
| 5,399,832 | A | 3/1995 | Tanisaki et al. |
| 5,620,743 | A | 4/1997 | Harth et al. |
| 5,807,615 | A | 9/1998 | Sindzingre et al. |
| 5,941,448 | A | 8/1999 | Sindzingre et al. |
| 6,241,858 | B1 | 6/2001 | Phillips et al. |
| 6,252,015 | B1 | 6/2001 | Vincenzi et al. |
| 6,428,861 | B2 | 8/2002 | France et al. |
| 6,569,397 | B1 * | 5/2003 | Yadav et al. ................. 423/345 |
| 7,438,882 | B2 * | 10/2008 | Goodwin et al. ............. 423/337 |
| 2002/0192138 | A1 | 12/2002 | Yuill |

FOREIGN PATENT DOCUMENTS

| EP | 0617142 A1 | 9/1994 |
| EP | 0655516 A1 | 5/1995 |
| EP | 1090159 | 4/2001 |
| GB | 2259185 A | 3/1993 |
| JP | 58223333 | 12/1983 |
| JP | 03115578 A | 5/1991 |
| JP | 06000365 A | 1/1994 |
| JP | 6001870 | 1/1994 |
| JP | 6228739 A | 8/1994 |
| JP | 07328427 A | 12/1995 |
| JP | 11221517 | 8/1999 |
| JP | 2002127294 | 5/2002 |
| WO | WO9729156 A1 | 8/1997 |
| WO | WO9819965 | 5/1998 |
| WO | WO9920809 | 4/1999 |
| WO | WO0228548 | 4/2002 |
| WO | WO03086029 | 4/2003 |
| WO | WO03085693 | 10/2003 |
| WO | WO03086030 A1 | 10/2003 |
| WO | WO2004068916 | 1/2004 |

OTHER PUBLICATIONS

English language abstract for EP1090159 extracted from espacenet.com database Jan. 22, 2007.
English language abstract for JP6001870 extracted from espacenet.com database Jan. 22, 2007.
English language abstract for JP11221517 extracted from espacenet.com database Jan. 29, 2007.
English language abstract for JP58223333 extracted from espacenet.com database Jan. 29, 2007.
English language abstract for JP2002127294 extracted from espacenet.com database Jan. 22, 2007.
English language abstract for EP0655516 extracted from espacenet.com database Apr. 9, 2007.
English language abstract for JP03115578 extracted from Searching PAJ database Jul. 29, 2008.
English language abstract for JP6000365 extracted from espacenet.com datebase Apr. 9, 2007.
English language abstract for JP6228739 extracted from espacenet.com database Apr. 9, 2007.
English language translation and abstract for JP07328427 extracted from Searching PAJ, Jul. 29, 2008, 24 pages.

(Continued)

*Primary Examiner* — Randy Gulakowski
*Assistant Examiner* — Lindsay Nelson
(74) *Attorney, Agent, or Firm* — Howard & Howard Attorneys PLLC

(57) ABSTRACT

A method of forming a powder and/or discrete gel particles of a compound selected from the group of a metallic oxide, a metalloid oxide, a mixed oxide, an organometallic oxide, an organometalloid oxide, an organomixed oxide resin, and/or an organic resin from one or more respective organometallic precursor(s), organometalloid precursor(s) and/or organic precursors and mixtures thereof, comprising the steps of passing a gas into a means for forming excited and/or unstable gas species (1a), typically an atmospheric plasma generating means; treating said gas such that upon leaving said means the gas comprises excited and/or unstable gas species which are substantially free of electrical charges at a temperature of between 10° C. and 500° C. A gaseous and/or liquid precursor is then introduced (50a,50b) into said excited and unstable gas species in a downstream region external (20) to the means for forming excited and/or unstable gas. The interaction between the precursor and the excited and unstable gas species results in the formation of a powder and/or discrete gelled particles which are subsequently collected. The particles prepared by the method may be subsequently functionalised.

14 Claims, 2 Drawing Sheets

OTHER PUBLICATIONS

Figure 1:
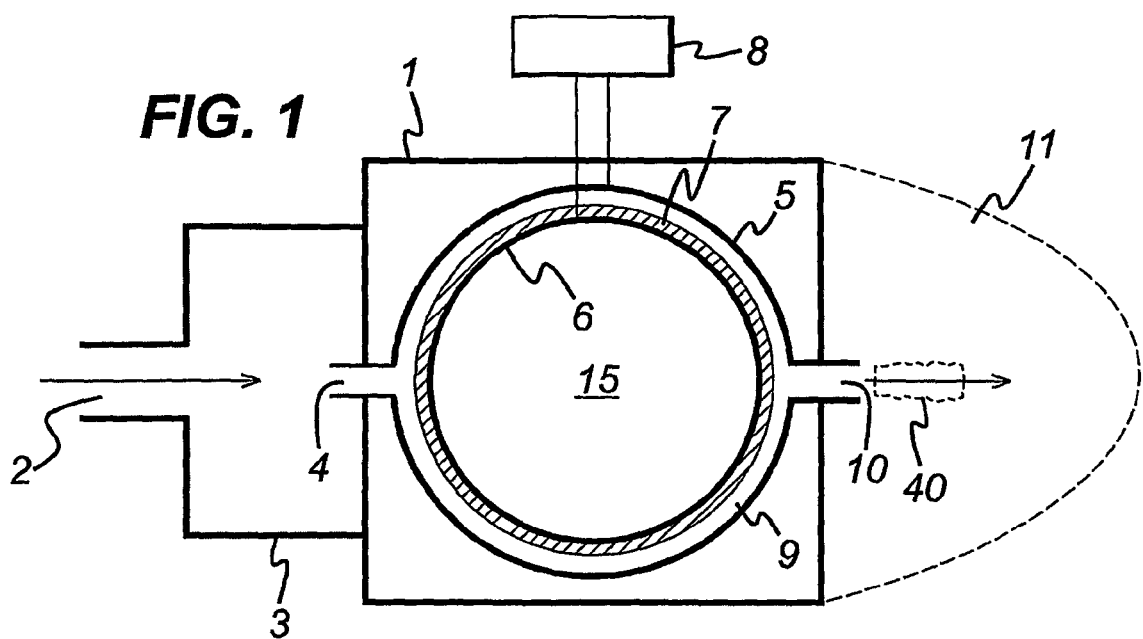

Mori et al., "Development of silica coating methods for powdered pigments with . . . ", Thin Solid Films, No. 316, 1998, pp. 89-92.

Oqawa et al., "Zirconia coating on amorphous magentic powder by atmospheric pressure glow plasma", Thin Solid Films, No. 386, 2001, pp. 213-216.

Quede et al., "Thermal stability and flammability studies of coated polymer powers . . . ", Journal of Materials Science, No. 37, 2002, pp. 1395-1399.

Leroy et al., "Treatmet of a Polyethylene Powder Using a Remote Nitrogen Plasma Reactor . . . " Plasmas and Polymers, vol. 8, No. 1, 2003, pp. 13-29.

Berndt et al., "Plasma Spray Synthesis of Nanomaterials", Sponsored by the National Science Foundation, No. CTS9312896, 1996, 9 pages.

PCT International Search Report for PCT/EP2004/011611, Dated Feb. 3, 2005, 4 Pages.

* cited by examiner

MANUFACTURE OF RESINS

RELATED APPLICATIONS

This application claims priority to and all the advantages of International Application No. PCT/EP2004/011610, filed on Oct. 8, 2004, which claims priority to Great Britain Patent Applications Nos. GB 0324147.8, filed on Oct. 15, 2003, GB 0324143.7, filed Oct. 15, 2003 and GB 0403132.4, filed on Feb. 12, 2004.

The present application describes a method for making powders, particularly organosilicone resin powders from liquid and gaseous precursors.

Standard processes for making silicone resins generally involve the hydrolysis and condensation of chlorosilanes, alkoxysilanes and silicates, such as sodium silicate. These processes generally require the use of large volumes of solvents with a comparative low concentration of reactive agents in order to prevent/reduce the gelling of the resulting silicone resin products. Due to increasing concerns regarding the environment, industry is aware of a long felt need to avoid the need for the use of such large volumes of solvents wherever possible. One route to achieve this would be through using so-called "dry manufacturing processes" which require minimal and preferably no solvent to manufacture powdered silicone resins. This would reduce environmental concerns and would provide manufacturers with the added incentive of cost reductions attached to the avoidance for the need to store, use and dispose of and/or recycle large volumes of solvents. In the case of silicone resin manufacture other advantages which would be achieved by avoiding the need for solvents in the manufacturing process include the reduction of residence times, which are currently generally caused by the low concentration of reactants present in the reaction mixture, reduction in energy needed to heat reaction vessels, the avoidance for the need of a solvent exchange step to deliver resin products to customers in a liquid delivery medium suitable for the specific application of the customer and the avoidance for the need to have a spray drying step to deliver solid resins.

Silicone resins are generally described using the M, D, T and Q nomenclature in which M units have the general formula $R_3SiO_{1/2}$, D units have the general formula $R_2SiO_{2/2}$, T units have the general formula $RSiO_{3/2}$ and Q units have the general formula $SiO_{4/2}$. Generally, unless otherwise indicated, each R group is normally an organic hydrocarbon group, such as an alkyl group (e.g. methyl or ethyl) or an alkenyl group e.g. vinyl or hexenyl), however some of the R groups may be silanol groups).

Traditional "wet chemistry" processes are generally unable to deliver silicone resin compositions containing various ratio combinations of Q, T, D and/or M groups in discrete particles without gelling, especially in cases where partially functionalised. One particular problem has been the inability to allow the incorporation of wide ranges of organic groups and functionalising groups such as for example amine groups, —OH groups, epoxy groups, and carboxylic acid groups and derivatives such as acid anhydrides, perfluoro groups, acrylate groups and alkylacrylate groups and the like in the resin formulations. Improved control of the particle size ranges, molecular weight and molecular weight distribution are also desirable and not achievable by today's conventional processes.

Plasma, which is sometimes referred to as the fourth state of matter, is an at least partially ionised gaseous medium, made of excited, unstable and ionised atoms and molecules which emit visible and UV radiation. When matter is continually supplied with energy, its temperature increases and it typically transforms from a solid to a liquid and, then, to a gaseous state. Continuing to supply energy causes the matter to undergo a yet further change of state in which neutral atoms or molecules of the gas are broken up by energetic collisions to produce negatively charged electrons and positive or negatively charged ions. Other species generated in a plasma include high energy non-charged particles such as gas molecules in excited states, metastable compounds, molecular fragments and or radicals. The plasma is electrically neutral and therefore contains positive ions, negative ions and electrons in amounts such that the algebraic sum of their charges is zero. A plasma phase is obtained in the laboratory by subjecting a pure gas or a gaseous mixture to external excitation, which is most generally electrical.

The term "plasma" covers a huge range of systems whose density and temperature vary by many orders of magnitude. Some plasmas are very hot and all their microscopic species (ions, electrons, etc.) are in approximate thermal equilibrium, the energy input into the system being widely distributed through atomic/molecular level collisions; examples include flame based plasmas. Other plasmas, however, particularly those at low pressure (e.g. 100 Pa) where collisions are relatively infrequent, have their constituent species at widely different temperatures and are called "non-thermal equilibrium" plasmas.

In non-thermal equilibrium plasmas, free electrons are very hot with temperatures of many thousands of Kelvin (K) whilst neutral and ionic species remain cool. Because the free electrons have almost negligible mass, the total system heat content is low and the plasma operates close to room temperature thus allowing the processing of temperature sensitive materials, such as plastics or polymers, without imposing a damaging thermal burden. The hot electrons create, through high energy collisions, a rich source of radicals and excited and/or unstable species with a high chemical potential energy capable of profound chemical and physical reactivity. It is this combination of low temperature operation plus high reactivity which makes non-thermal equilibrium plasma technologically important and a very powerful tool for manufacturing and material processing as it is capable of achieving processes which, if achievable at all without plasma, would require very high temperatures or noxious and aggressive chemicals.

Because of their potential in industrial applications atmospheric pressure plasma (APP) systems are of particular interest to industry. APP includes atmospheric pressure non thermal equilibrium plasma which are typically generated between two parallel electrodes that vary in size and configuration but which need to be within several millimeters distance from each other. Depending on the electrical circuitry and on system configurations, atmospheric pressure glow discharge (APGD) and/or dielectric barrier discharge (DBD) plasmas are generally produced. Advantageously, when compared to many plasma-based systems currently available, APP operates at about atmospheric pressure and at low temperatures (<200° C. and preferably <100° C.). However, limitations exist with respect to system geometry, because the plasma is produced in a plasma region between parallel electrodes with very small gaps between electrodes. It is ideally suited to treat flat, thin and flexible substrates like plastic films, textile webs, etc.

In the case of the preparation of powders using APGD type processes, one problem regarding the geometry of the system is that during the generation of powders, other species such as particles, by-products, reactants and/or treated particles may deposit on the electrodes thereby negatively affecting the electrical and chemical properties of the plasma and potentially the duration of usefulness of the electrodes. Further-more, the use and/or preparation of electrically conducting particles using APGD is difficult as such particles would interact with the electrical field and create filaments or local discharges and potentially adhere to electrode surfaces.

Recently, new plasma systems have been developed which produce plasmas using gases passing between adjacent electrodes at high flow rates. These gases pass through the plasma region defined by the shape of the electrodes and exit the system in the form of excited and/or unstable gas mixtures at around atmospheric pressure. These gas mixtures are characterized by being substantially free of electrical charged species which may be utilized in downstream applications remote from the plasma region, i.e. the gap between the adjacent electrodes in which plasma is generated. This "atmospheric pressure post plasma discharge" (APPPD) has some of the physical characteristics of low pressure glow discharge and APGD including, for example, glow, presence of active light emitting species and chemical reactivity. However, some clear and unique differences exist including the facts that APPPD has higher thermal energy, absence of boundary walls e.g. no electrodes, substantial absence of electrically charged species, large choice of gases and mixture of gases, large flow rate of gases.

U.S. Pat. No. 5,807,615 describes a "post discharge" atmospheric pressure plasma system for depositing e.g. silicon oxide films on metal substrates wherein a "primary" gas is excited by being passed through a plasma and is then mixed with a precursor gas downstream of the plasma. The precursor gas was a silicon containing compound which has not been plasma treated. The precursor gas was excited by interaction with the primary gas resulting in the formation of a film on a substrate surface. The post discharge nature of this system resulted in the substantial absence of any electrically charged species other than in the plasma region between the electrodes. Column 3 lines 33-40 states that "since the silicon precursor gas has not passed through the apparatus the risk of forming silica powder (or more generally powders of silicon compounds) inside the plasma discharge is consequently eliminated."

WO 03/086029, which was published after the earliest priority date of the present application, describes the preparation of metallic oxides, metalloid oxides and mixed metal oxides within the plasma generated between the electrodes by Glow Discharge Plasma at both low and atmospheric pressures.

WO 02/28548 describes a process for enabling the introduction of a solid or liquid precursor into an atmospheric pressure plasma discharge and/or an ionised gas stream resulting therefrom in order to form a coating on a substrate. The substrate may be a powder. It does not discuss the making of powders by this method.

Metal oxides and metalloid oxides are made by a wide variety of processes. Titanium dioxide for example may be made by mixing titanium ores in sulphuric acid to make titanium sulphate, which is then calcined to produce titanium dioxide. Silicon dioxide or titanium dioxide may be prepared by reacting their respective chloride with oxygen at an elevated temperature. In this method, the reactants are brought to reaction temperatures by combusting a flammable gas such as methane or propane.

The use of thermal-equilibrium plasma processes for the production of the oxides of silicon, titanium, aluminium, zirconium, iron and antimony has been described in US 20020192138 in which a plasma generator producing a temperature of between 3000 and 12000° C. is used to oxidize vapours of salts of the above metals and metalloids. Karthikeyan et al., Materials Science & Engineering, A238, 1997 pp. 275-286, describe a method for the preparation of alumina, zirconia and yttria using a high temperature plasma jet to melt and spray the feedstock into a reaction system to form nanoparticles by "plasma jet spray pyrolysis". WO98/19965 describes a process using microwave plasma to produce ultrafine powders whereby reactants are passed through the plasma zone Excitation of the reactants due to passing through a plasma is used to initiate reactions.

Whilst there is a large volume of published information relating to the formation of silica or silicone resin based coatings on substrates little effort appears to have been carried out into the preparation of particles using a plasma type system as the electrical discharge means to generate excited and/or unstable gas species in a post discharge phase. Coopes et al., J. of Appl. Polym. Sci., 37(12), 1989, p 3413-22 investigated the formation of films at low pressure derived from hexamethyldisiloxane precursors; R. d'Agostino et al., Polymer Preprints, 34(1), 1993, p 673-4 describe investigations on the low-pressure deposition of organosilicon thin films (where the organic groups are methyl groups) by PE Chemical vapour deposition (CVD) using $Si(OEt)_4$-$O_2$ and hexamethyldisilazane-$O_2$ discharges.

EP 1090159 describes the deposition of silicon dioxide films by introducing tetraethyl orthosilicate (TEOS) into the effluent stream of a low temperature (85 to 350° C.) atmospheric pressure plasma jet (APPJ). EP 0617142 described the preparation of silica thin films prepared using an APGD process. JP06-001870 describes the preparation of laminates using low-pressure plasma CVD (<0.2 Torr) in which a hard and abrasion resistant coating is by treating hexamethyldisiloxane in $O_2$ or $N_2O$ at 80° C. JP2002-127294 describes the formation of gas-barrier plastics films and uses a low pressure plasma CVD (50 to 500 mTorr) to form a silica layer. JP 58-223333 describes the fabrication of semiconductor devices with good electrical properties by coating the device with a silicone resin formed by low-pressure plasma polymerisation of silane coupling agents. JP 11-221517 describes reflective films for automotive lighting applications which include a topcoat film may be formed by low-pressure plasma polymerisation (<$8\times10^{-2}$ Torr) of monomers such as hexamethyldisiloxane and $Si(OEt)_4$.

In accordance with the present invention there is provided a method of forming a powder and/or discrete gel particles of a compound selected from the group of a metallic oxide, a metalloid oxide, a mixed oxide, an organometallic oxide, an organometalloid oxide, an organomixed oxide resin, and/or an organic resin from one or more respective organometallic precursor(s), organometalloid precursor(s) and/or organic precursors; comprising the steps of:

i) passing a gas into a means for forming excited and/or unstable gas species;

ii) treating said gas such that upon leaving said means the gas comprises excited and/or unstable gas species which are substantially free of electrical charges at a temperature of between 10° C. and 500° C.;

iii) introducing a gaseous and/or liquid precursor which has not been subjected to steps (i) and (ii) into said excited and/or unstable gas species in a downstream region external to the means for forming excited and/or unstable gas, interaction between said precursor and said excited and unstable gas species resulting in the formation of a powder and/or discrete gelled particles; and iv) collecting resulting powder and/or discrete gelled particles.

For the purposes of this application a powder is a solid material in the form of nanoparticles, nanotubes, particles, particulates, pellets, platelets, needles/tubes, flakes, dust, granulates and any aggregates of the aforementioned forms. A gel is a typically jelly-like material in the form of a thin film or solidified mass. It is to be understood that the term "electrically charged species" as used herein is intended to mean ions and electrons. Reference hereafter to the term powdered product shall be understood to mean the product of the process of the present invention including powders and/or discrete gelled particles.

The means for forming excited and/or unstable gas species at a temperature of between 10° C. and 500° C. is adapted to excite a gas or gases passing therethrough, which gas or gases upon leaving said means comprises excited and/or unstable gas species which are substantially free of electrical charges. Such excitation is preferably obtained by electrical discharge between pairs of electrodes, for example, of the non-thermal equilibrium plasma type, such as glow discharge and/or dielectric barrier discharge. Other methods capable of exciting a gas mixture, such as corona discharge, light radiation assisted processes e.g. laser, and any other high energetic methods, may be used and therefore are to be interpreted as falling within the scope of this invention. Preferably, the excited gas mixture is generated in a non-thermal equilibrium plasma and/or dielectric barrier discharge and/or corona discharge under approximately atmospheric pressure conditions (e.g. from about $0.1 \times 10^5$ Pa to about $3 \times 10^5$ Pa but preferably at a pressure of between from about $0.5 \times 10^5$ Pa to about $1.5 \times 10^5$ Pa). Most preferably the means for forming excited and/or unstable gas species is a non-thermal equilibrium plasma system adapted to provide a post plasma discharge region of excited and/or unstable species downstream from and preferably external to the means for forming excited and/or unstable gas species. Henceforth this region will be referred to as "the downstream region". The downstream region is generally substantially free of charged particles. The operating temperature of the means for forming excited and/or unstable gas species is between 10 and 500° C., preferably between 10 and 400° C. More preferably the operating temperatures of such apparatus is from about room temperature (i.e. about 20° C.) to about 200° C. but most preferably, the method of the present invention will operate at temperatures between room temperature (20° C.) and 160° C. Preferably, gas to be excited by the plasma has a high flow rate of greater than 50 liters/min, preferably in the range of from 50 liters/min to 500 liters/min, more preferably from about 75 liters/min to 300 liters/min through the means for forming excited and/or unstable gas species.

The means for forming excited and/or unstable gas species at a temperature of between 10° C. and 500° C. may comprise any equipment suitable for use in producing a downstream region. An atmospheric pressure non-equilibrium plasma system, particularly an atmospheric pressure glow discharge having a sufficiently high gas flow rate for the production of a downstream region is preferred. Many atmospheric pressure based plasma systems such as glow discharge based systems typically have low gas flow rate systems in which the plasma is generated between adjacent electrodes and do not provide a downstream region of the type required in accordance with the present invention and as such are unsuitable for the preparation of particles in accordance with the present invention. A sufficiently high gas flow rate for the production of a downstream region is preferred might, for example be greater than 50 liters a minute, but is determined based on the geometry of the apparatus being used The means for forming excited and/or unstable gas species may alternatively be a dielectric barrier discharge and/or corona discharge system having a sufficiently high gas flow rate in order to provide a suitable downstream region, which is preferably substantially free of charged species, for treating the functionalising precursors in accordance with the method of the present invention. Particularly preferred means for forming excited and/or unstable gas species include the so-called plasma jet and plasma knife type systems.

Particularly preferred systems for the present invention are the means for forming excited and/or unstable gas species as described in U.S. Pat. No. 5,941,448 and/or in the applicant's co-pending application WO 03/085693, when used with a dynamic gas flow. WO 03/085693 was published after the earliest priority date of the present invention.

A typical means for forming excited and/or unstable gas species for use in the method of the present invention is an atmospheric pressure non-equilibrium plasma system which may incorporate an electrode configuration comprising one or more pairs of concentric electrodes between which a plasma is generated and/or dielectric barrier discharge and/or corona discharge occurs. The distance between the electrodes in which the plasma is generated is preferably a substantially constant gap of from 1 to 100 mm, preferably from 2 to 10 mm between the electrodes. The electrodes being radio frequency (RF) energised with a root mean square (rms) potential of from 1 to 100 kV, preferably between 1 and 30 kV and most preferably between 2.5 and 10 kV, however the actual value will depend on the chemistry/gas choice and plasma region size between the electrodes. The frequency is generally between from 1 to 500 kHz, preferably at 10 to 300 kHz. The power used in the apparatus is preferably greater than or equal to 1 $W/cm^2$, more preferably greater than or equal to 10 $W/cm^2$ and most preferably will be between from about 10 to about 100 $W/cm^2$ (normalised per unit surface area of dielectric).

The preferred electrode system comprises a concentric cylindrical electrode configuration having an inlet for the introduction of the gas to be excited and an outlet, in the form of a slit, through which excited and/or unstable gas is able to leave the excitation region, i.e. the plasma region in which a plasma is generated. The excitation region is substantially the gap between adjacent pairs of concentric electrodes where a plasma is formed and/or dielectric barrier discharge and/or corona discharge occurs. The electrode configuration typically comprises an inner cylindrical electrode and an outer concentric tubular electrode. At least one of the electrodes has a layer of a dielectric material between it and the other electrode. Preferably, at least the inner face of the outer electrode or the outer face of the inner electrode is covered with a dielectric material. A slit is provided along most of the axial length of the outer electrode configuration in order to provide an elongate source of excited and/or unstable gas in the downstream region into which functionalising precursor is introduced. In such a configuration a plume is visible substantially immediately external to the slit in the outer electrode. The visible plume is generally considered to be caused by excited and/or unstable species (atoms and molecules) e.g. metastables, giving off energy when returning to their ground state after having been in the downstream region.

Metal electrodes may be used. These may be, for example, in the form of metallic cylinders, tubes, pins, plates or mesh. The metal electrodes may be bonded to dielectric material either by adhesive or by some application of heat and fusion of the metal of the electrode to the dielectric material. Alternatively one or more of the electrodes may be encapsulated within a dielectric material or may be in the form of a dielectric material with a metallic coating such as, for example a dielectric, preferably a glass dielectric with a sputtered metallic coating. Alternatively and where suitable the electrodes used in the present invention may be of the substantially non-metallic type described in the applicants co-pending application WO 2044/068916 which was published after the priority date of this application.

The dielectric materials may be made from any suitable dielectric, examples include but are not restricted to polycarbonate, polyethylene, glass, glass laminates, epoxy filled glass laminates, ceramics and the like.

The introduction of the excited and/or unstable gas species into the downstream region is preferably achieved by passing a gas, at a high flow rate (e.g. greater than 50 liters/min), through the electrode configuration of the atmospheric pressure non-equilibrium plasma system described above, which, when a potential difference is applied between the electrodes, generates a plasma or dielectric barrier discharge and/or corona discharge between adjacent pairs of electrodes. When a plasma is generated between the electrodes, the gap between the electrodes will contain an ionised gaseous medium, comprising excited, unstable and ionised atoms and molecules and will emit visible and UV radiation. Gas having passed between the electrodes and out through the slit comprise an excited and/or unstable gas mixture which is substantially free of electrically charged species as substantially all the charged species will remain in the gap between the electrodes. The visible plume which is observed at the slit is the effect of the high energy non-charged excited and unstable atoms and molecules such as metastable atoms and/or molecules, gas molecules in excited states, molecular fragments and/or radicals giving off energy when returning to their ground state.

The geometry of the above electrode configuration means that a system of this type offers unique advantages that allow practical, economic, and large-scale production.

Preferably the means for forming excited and/or unstable gas species is adapted to introduce excited and/or unstable gas species into a downstream region which is retained in a suitable reactor. Any suitable reactor may be utilised, but preferably the reactor is a fluidised or circulating bed reactor. A fluidised or circulating bed in the context of the present invention means a process based on fluidised beds of solid particles, in which the solids, by suspension or agitation, exist in an expanded state with zero angle of repose and assume the shape of the containing vessel. Such fluidised beds may also be known as moving bed, aerated beds, self supporting or boiling beds, bubbling beds and turbulent beds, and when the gas superficial velocities are high enough can also become relatively dilute circulating and transport systems. Fluidisation is generally achieved by pneumatic gas velocity means but can also be assisted by mechanical and sonic means known to those skilled in the art. Transport systems suitable for the present invention include the fluidised bed systems described in Perry's Chemical Engineer's Handbook 6th Ed, 1984 pages 20-59 to 20-77 with particular reference to FIGS. 20-75. Alternative reactors which may be utilised for the method in accordance with the present invention include, for example rotating drums, rotary kilns, jet mixers, flat bed reactors (FBR) with recycle/ageing loops, static mixing reactors, sonic mixing reactors, vibrating beds, conveyor belts, tumblers alone or in any suitable combination.

When the reactor used for the present invention is in the form of a fluidised or circulating bed, the means for forming excited and/or unstable gas species is preferably positioned such that the gas which is used as the source of excited and/or unstable gas species in the downstream region at the base of the fluidised or circulating bed reactor is also utilised as the gas supporting the fluidised or circulating bed. The use of a fluidised or circulating bed type of system results in excellent mixing and thereby a generally consistent product particle size, which may be substantially predetermined by pre-setting the exposure time of the precursors in the downstream region of the fluidised or circulating bed.

Additional gas inlets or exits from external gas sources and/or additional means for forming excited and/or unstable gas species may be positioned anywhere in the fluidised or circulating bed e.g. at the bottom, side or top of the reactor, to assist in suspending particles and/or droplets or the like against gravity. Each of said additional means would utilize the same source of gas as the gas for the fluidised or circulating bed. A single acoustic self-oscillating jet plasma head may be utilised to offer dynamic mixing/fluidisation in the fluidised or circulating bed as well as forming a plasma between electrodes.

The use of such fluidised or circulating beds enables precursor and/or resulting powdered product circulating therein to be transportable through both the downstream region and where appropriate through the external plume.

The precursor is preferably introduced into the reactor in the form of an atomised liquid and/or gas precursor but may be introduced in the form of a solid or a liquid/solid slurry. For the sake of this invention a liquid shall be understood to mean liquid compound, a solution of a high viscosity liquid or solid compound in either a liquid carrier or a liquid co-reactive and/or a molten solid.

However, alternatively, the powdered product and/or precursor may be maintained stationary in a suitable container which may be fixed in the downstream region, in which case, if required, the means for forming excited and/or unstable gas species may be moved relative to the container and the precursor may be adapted to be introduced directly into the container. Whichever means of transporting and/or retaining the powdered product and/or precursor is utilised, it is preferred that the exposure time in which powdered product and/or precursor remains within the downstream region is constant in order to ensure an even treatment throughout the duration of the method in accordance with the present invention.

The use of liquid based precursors provides the invention with a major advantage over the prior art in that the liquid precursors may be introduced into the excited and/or unstable gas in the downstream region of the reactor in the absence of a carrier gas, i.e. a liquid precursor can be introduced directly into the reactor by direct injection. Hence, the inventors avoid the need for the essential features of US 20020192138 that as discussed above requires both very high working temperatures and the need for the salts to be in a vaporous form.

Any suitable atomiser may be utilised for the atomisation and introduction of said liquid precursor, examples include the use of an ultrasonic nozzle or pneumatic nebulisers and nozzles. The atomiser preferably produces a liquid precursor drop size of from 10 nm to 100 μm, more preferably from 1 μm to 50 μm. Suitable atomisers for use in the method in accordance with the present invention are ultrasonic nozzles from Sono-Tek Corporation, Milton, N.Y., USA or Lechler GmbH of Metzingen Germany and Pneumatic nozzles or intersurgical chambers from Clement Clarke International.

The apparatus which may be utilised in the method in accordance with the present invention may include a plurality of atomisers.

When using a liquid precursor, the liquid precursor may also be entrained on a carrier gas or transported in a vortex or dual cyclone type apparatus, in which case the liquid to be treated may be fed in through one or more inlets within e.g. a fluidised bed In the case where a fluidised or rotating bed is utilised, the precursor may be introduced into the fluidised bed at any appropriate position but is preferably introduced directly into the downstream region(s) of excited and/or unstable gas (when a plasma or the like is being generated).

Preferably ageing and/or recycling loops may be provided such that powders and/or precursors etc. may be removed from and re-introduced into the reactor until the required functionalised product has been prepared. These may be particularly useful when a predetermined particle size is required with respect to the powdered product.

Preferably, powder and/or discrete gel particles which are formed in the downstream region in accordance with the present invention (preferably in a fluidised or circulating bed), are prevented from passing into the electrode configuration through the exit slit and depositing on one or more of the electrodes, by the flow rate of the gas or excited and/or unstable gas entering the fluidised or circulating bed through the slit, dependent on whether or not a plasma is being generated between the electrodes. However, where appropriate an electrically conducting mesh may be placed in the fluidised or circulating bed external to the outer electrode, preferably between the external plume and the downstream region. The inclusion of the mesh may serve several purposes. Firstly it significantly reduces the opportunity for and preferably prevents particles of functionalised and non-functionalised powders obtained in accordance with the method of the present invention, entering the slit and depositing on an electrode surface. Secondly, it also substantially prevents any residual charged species from entering the downstream region. Thirdly it acts as a means of distribution for the gas being introduced into the fluidised or circulating bed, i.e. it will spread the entry of gas into the fluidised or circulating bed. The electrically conducting mesh may be made from any suitable material but is preferably made from stainless steel, copper or the like. The electrically conducting mesh may have a voltage applied to it such that it will attract or repel all positively or negatively charged molecules present in the plume and thereby prevent said charged molecules from entering the downstream region in the fluidised or circulating bed.

Powdered product particles resulting from the method in accordance with the present invention may be collected by any suitable means. For example, they may be collected by electrostatic precipitators, filters, cyclones, scrubbers and/or electrophoresis and the like. Other options for collecting the resulting product include a statically electric charged porous plate or a vibrating sieve placed in line with the exit of the powdered particles from the plasma region to collect the resulting powdered particles. In one embodiment of the invention a statically electric charged porous plate or a vibrating sieve may be placed in line with the exit of the powdered substrate from the reactor to collect the resulting powdered substrate. Preferably the means for collecting the end product may be positioned downstream of the excited and/or unstable gas regions, particularly in cases where the resulting product particles are very fine e.g. nanoparticulate sized particles where the particles float in e.g. a fluidised or circulating bed.

Hence in one preferred embodiment of the present invention there is provided a single unit comprising the means for forming excited and/or unstable gas species, a precursor introduction means for introducing precursors into the downstream region where said precursors can interact with excited and/or unstable gas during periods wherein the means for forming excited and/or unstable gas species is operational and a suitable means of collecting the end product.

The precursor and in some cases powdered product interacts with the excited and/or unstable gas and functionalising precursors in the downstream region.

The gas used to form the excited and/or unstable gas species which are provided to the downstream region need not comprise noble gases such as helium and/or argon and therefore may be solely air, nitrogen, oxygen, hydrogen or the like and any suitable mixture thereof. Where an oxidising or reducing gas is required to be included in the gas used to form the excited and/or unstable gas species, the gas used may comprise a mixture of, for example, nitrogen with an appropriate oxidising gas such as $O_2$, $H_2O$, $CO_2$, $CO$, nitrogen oxides (such as $NO_2$), or air and nitrogen with an appropriate reducing gas, e.g. $H_2$, $CH_4$ or $NH_3$ when a reducing plasma environment is required. However, the selection of gas depends upon the plasma processes to be undertaken. Oxidizing or reducing gases will be used alone or in mixtures, typically with nitrogen in any appropriate mixture such as for example in the case of an nitrogen and oxygen mixture, the mixture may comprise 90-99.995% nitrogen and 50 ppm to 10% oxidizing or reducing gas. The noble gases, Ar, He, Ne, Xe and Kr may be utilised alone or in combination with oxidising or reducing gases (Ar and/or He being the most preferred) but are expensive and as such are only used if needed. Mixtures of any of the above may also be used where deemed appropriate.

Under oxidising conditions, the present method may be used to form an oxygen containing coating on the powdered substrate. For example, silica-based coatings can be formed on the powdered substrate surface from atomised silicon-containing coating-forming materials. Under reducing conditions, the present method may be used to form oxygen free coatings, for example, silicon carbide based coatings may be formed from atomised silicon containing coating forming materials The metals, whose oxides and the like to which this invention particularly relates, are those of columns 3a and 4a of the periodic table, namely aluminium, gallium, indium, tellurium, tin, lead and the transition metals. Hence, metallic oxide products of the present invention may be either single metal oxides such as, for example, the oxides of titanium, zirconium, iron, aluminium, indium, lead and tin, mixed oxides include, for example, aluminium silicate, aluminium titanate, lead bisilicate, lead titanate, zinc stannate, $TiO_2$-$ZrO_2$—$SiO_2$—$SnO_2$ and a mixed indium-tin oxide. Proportions of mixed oxides may be determined by the ratios of the amounts of each constituent of the precursor to be plasma treated in the method of the present invention.

A metalloid or semi-metal (hereafter referred to as a metalloid) is an element having both metallic and non-metallic properties and is selected from boron, silicon, germanium, arsenic, antimony and tellurium. Preferred metalloid oxide products made according to the method of the present invention are in particular oxides of silicon including silicone resins and the like, boron, antimony and germanium. (It is to be understood that an organometallic oxide, an organometalloid oxide, and an organomixed oxide resin are oxides as described previously which additionally comprise organic groups.)

Particularly preferred are the preparation of organofunctional metallic, metalloid and/or mixed oxides resins following the above composition description with the addition of organic groups in the composition for example amino groups, aldehyde groups alkyl halide groups, alkyne groups, alcohol groups, amido groups, carbamate groups, urethane groups, grafted or covalently bonded biochemical groups such as amino acids and/or their derivatives, grafted or covalently bonded biochemical species such as proteins, enzymes and DNA and organic salts, carboxylic acid groups and their derivatives such as acid anhydride groups, organic groups containing boron atoms or phosphorus or sulphur containing groups such as mercapto and sulphido groups. In particular a silicone resin having the following empirical formula:—

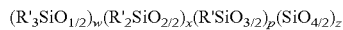

where each R' is independently an alkyl, alkenyl, aryl, H, OH, or any of the groups described in the previous paragraph and wherein $w+x+p+z=1$ and $w<0.9$, $x<0.9$, $p+z>0.1$ may be formed by the method in accordance with the present invention An organic resin obtainable in accordance with the present invention may be any suitable organic resin, for example, polyethylene, polypropylene, polystyrene, polyacrylic acid, polyacrylates, polymethacrylates, polyethylene oxide, epoxy resins, polyvinyl alcohol, polyvinyl acetate, and any organic resins containing phosphorus, halogen containing resins such as for example polyvinyl chloride, polyvinylidene fluoride, nitrogen containing polymers such as for example polyurethane, polyamide, polyimide or sulphur containing resins such as for example polythiophene and/or polyphenylsulfone.

Preferably in the case of organometallic based precursors, the precursor may for example contain any suitable oxidisable groups including chlorides, hydrides, diketonates, carboxylates and mixed oxidisable groups for example, di-t-butoxydiacetoxysilane or titanium dichloro diethoxide, titanium diisopropoxide bis(ethyl-acetoacetate) or titanium diisopropoxide bis(tetramethylheptanedionate), but liquid metal alkoxides are particularly preferred. Liquid metal alkoxides suitable for use as precursors in the present invention may, for example, have the following general formula:—

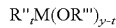

where M is a metal, y is the maximum number of alkoxide groups which may be bonded to the metal, t is 0 or an integer between 1 and y, each R" group may be selected from alkyl, alkenyl, aryl, H, OH, amino groups, aldehyde groups alkyl halide groups, alkyne groups amido groups, carbamate groups, urethane groups, organic salts, carboxylic acid groups and their derivatives such as acid anhydride groups, organic groups containing boron atoms and phosphorus and sulphur containing groups such as mercapto and sulphido groups and grafted or covalently bonded biochemical groups such as amino acids and/or their derivatives, grafted or covalently bonded biochemical species such as proteins, enzymes and DNA, each R''' is the same or different and is a linear or branched alkyl group having between 1 and 10 carbon atoms such as, for example, methyl, ethyl, propyl, isopropyl, butyl, t-butyl, pentyl and hexyl. Examples of suitable metal alkoxides include, for example, titanium isopropoxide, tin t-butoxide and aluminium ethoxide. Mixed metallic alkoxides may also be used as liquid precursors, for example indium-tin alkoxides, aluminium titanium alkoxides, aluminium yttrium alkoxides, and aluminium zirconium alkoxides. Metallic-metalloid mixed alkoxides may also be utilised such as for example di-s-butoxyaluminoxytriethoxysilane.

Similarly organometalloid liquid precursors may contain any suitable groups, which will react in the excited and/or unstable gas into which the precursor is introduced in accordance with the present invention to form the respective oxide or the like, and in particular, in the case of silicon, to form silicon resins, such as alkoxy groups and chloro groups. Examples of suitable metalloid alkoxides include silicon tetramethoxide and germanium tetraisopropoxide. It is to be understood that the term organometalloid liquid as used herein includes polymers of organometalloid elements and in particular in the case of silicon preferably include liquid organosilanes such as, for example diphenylsilane and dialkylsilanes, e.g. diethylsilane and functionalised silanes containing one or more of the following:—alkenyl, aryl, H, OH, amino groups, aldehyde groups alkyl halide groups, allyne groups amido groups, carbamate groups, urethane groups, organic salts, carboxylic acid groups and their derivatives such as acid anhydride groups, organic groups containing boron atoms and phosphorus and sulphur containing groups such as mercapto and sulphido groups and grafted or covalently bonded biochemical groups such as amino acids and/or their derivatives, grafted or covalently bonded biochemical species such as proteins, enzymes and DNA.

Alternatively, the precursor for silicon based powder and/or discrete gel particle products may comprise linear, branched and/or cyclic organopolysiloxanes for the formation of silica and silicates (silicone resins). The linear or branched organopolysiloxanes suitable as liquid precursors for the method of the present invention include liquids of the general formula W-A-W where A is a polydiorganosiloxane chain having siloxane units of the formula $R''_sSiO_{4-s/2}$ in which each R'' independently represents an alkyl group having from 1 to 10 carbon atoms, an alkenyl group such as vinyl, propenyl and/or hexenyl groups; hydrogen; an aryl group such as phenyl, a halide group, an alkoxy group, an epoxy group, an acryloxy group, an alkylacryloxy group or a fluorinated alkyl group and generally s has a value of 2 but may in some instances be 0 or 1. Preferred materials are linear materials i.e. s=2 for all units. Preferred materials have polydiorganosiloxane chains according to the general formula —$(R''_2SiO)_m$— in which each R'' may be the same or different and is as hereinbefore described and m has a value from about 1 to about 4000. Suitable materials have viscosities of the order of about 0.65 mPa·s to about 1,000,000 mPa·s. When high viscosity materials are used, they may be diluted in suitable solvents to allow delivery of liquid precursor in the form of a finely dispersed atomised spray, or fine droplets, although as previously discussed, it is preferred to avoid the need for solvents if possible. Most preferably, the viscosity of the liquid precursor is in the range between about 0.65 mPa·s and 1000 mPa·s and may include mixtures of linear or branched organopolysiloxanes as hereinbefore described suitable as liquid precursors.

The groups W may be the same or different. The W groups may be selected, for example, from —$Si(R'')_2X$, or

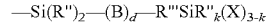

where B is —$R'''—(Si(R'')_2—O)_r—Si(R'')_2$— and

R'' is as aforesaid, R''' is a divalent hydrocarbon group, r is zero or a whole number between 1 and 6 and d is zero or a whole number, most preferably d is zero, 1 or 2, k is zero, 1, 2 or 3, X may be the same as R'' or a hydrolysable group such as an alkoxy group containing alkyl groups having up to 6 carbon atoms, an epoxy group or a methacryloxy group or a halide.

Cyclic organopolysiloxanes suitable as liquid precursors for the method of the present invention include those having the general formula $(CR''_2SiO_{2/2})_n$ wherein R'' is hereinbefore described, n is from 3 to 100 but is preferably from 3 to 22, most preferably n is from 3 to 6. Liquid precursors may comprise mixtures of cyclic organopolysiloxanes as hereinbefore defined.

In a still further alternative the precursor may comprise a metal hydride, hydroxide, nitride, sulphate, sulphide, oxide hydrate or halide, preferably chloride. Whilst the metal may be any suitable metal, titanium, zirconium, aluminium, tin, indium and mixtures thereof are preferred. Specific examples of using titanium, for example comprise titanium hydride, titanium hydroxide, titanium tetrachloride, titanium nitride, titanium sulphate and titanium oxide hydrate.

The gaseous and/or liquid precursor may also comprise mixtures comprising one or more of the linear or branched organopolysiloxanes as hereinbefore described with one or more of the cyclic organopolysiloxanes as hereinbefore described.

Organic precursors for the preparation of organic resins obtainable in accordance with the present invention may be any suitable organic monomers and/or oligomers for example ethylene, propylene, acrylic acid, acrylates, methacrylates, and any organic precursors containing phosphorus, containing halogens for example vinyl chloride, vinylidene fluoride, containing nitrogen for example urethane, amide, imide or containing sulphur for example thiophene, phenylsulfone.

Preferably in the method of the present invention precursors are introduced in gaseous or liquid form including molten metals with solids solubilised in a suitable liquid carrier, i.e. a solvent or a liquid co-reactive compound (although wherever possible it is preferred to avoid the use of solvents). Organometallic liquids and gases (although the use of liquid precursors is particularly preferred) of the above listed metals and/or organometalloid liquid precursors of the above listed metalloids are particularly preferred. One of the main advantages of the present invention is that no solvent is usually required and preferably no solvent is used at all, i.e. the organometallic and/or organometalloid gaseous or liquid precursors used in the method of the present invention are solvent-free and the resulting powder and/or discrete gel particle product is made in a solvent free environment, thereby avoiding the need of a solvent exchange step to deliver resin products to customers in a liquid carrier suitable for the specific application of the customer and avoiding the need to have a spray drying step to deliver the silicone resins in a solid form In one embodiment of the present invention the method of the present invention is used to provide a one-step preparation of functional resins from precursors e.g. silanes with dry recovery or in liquid carrier suitable for targeted application.

In an alternative embodiment of the present invention a multiple series of treatments of the powdered product may occur. The powder and/or discrete gel particle products produced by the method of the present invention may subsequently be treated as required, using plasma techniques or otherwise, by any suitable process. In particular powder and/or discrete gel particle products made by the present invention may be cleaned and/or activated or coated, for example, by application of a liquid or solid spray through an atomiser or nebuliser as described in the applicants co-pending application WO 02/28548.

For example a powdered product produced in accordance with the method of the present invention may be retained or reintroduced into the reactor, typically a fluidised bed, and may initially be activated or the like by interaction with excited gaseous species. The gaseous species could be an oxidising gas or reducing gas. After a period of activation the plasma may be stopped whilst maintaining the flow of gas to fluidise the contents of the fluidised bed and then a suitable first functionalising precursor may be introduced to interact with the activated powdered product now acting as a powdered substrate. The substrate treated with the first functionalising precursor may then be reactivated by regenerating the plasma and therefore the downstream region. For example if the first functionalising precursor is a compound containing O—Si—H bonds, subsequent to functionalisation such bonds might be oxidised in an oxidising excited gas such as air resulting in the provision of the more reactive O—Si—OH. A further functionalising precursor may then be added and the process continued until a sufficient loading of functionalising groups required has been achieved for the purpose required. The man skilled in the art will appreciate that an enormous range of alternative processes may be entertained using this route to gradually build up functionalised coatings on the substrates by the method in accordance with the present invention.

The functionalising precursor is preferably in the form of a liquid and/or gas precursor but may be introduced in the form of a solid or a liquid/solid slurry. When using a liquid functionalising precursor, the liquid functionalising precursor may be entrained on a carrier gas or transported in a vortex or dual cyclone type apparatus, in which case the liquid to be treated may be fed in through one or more inlets within e.g. a fluidised bed.

When using a functionalising precursor in liquid form and where used solid or liquid/solid slurry, the liquid may be introduced into the reactor and/or brought into contact with the powdered substrate and where appropriate the excited and/or unstable gas using any suitable means. In a preferred embodiment, the liquid precursor is preferably introduced into the reactor (typically a fluidised bed) by way of a liquid spray through an atomiser or nebuliser as hereinbefore described.

The functionalising precursor may come into contact with the powdered substrate in either the presence or absence of the excited and/or unstable gas species. Where required the functionalising precursor is introduced whilst the excited and/or unstable gas species generating means, typically an atmospheric non-equilibrium plasma system, is operational. However, in the case where only a powdered substrate needs to be activated by excited and/or unstable gas species, the plasma may be stopped, resulting in the substantial absence of excited and/or unstable gas species during the period of interaction between the previously activated powdered substrate (activated by interactions in the downstream region with the excited and/or unstable gas species) and the functionalising precursor. It will be appreciated that whilst the plasma generator is switched off, unexcited gas or gases may continue to pass through the means for generating excited and/or unstable gas species (confusing) in order to maintain the functioning of the fluidised bed during the interaction between the activated powdered substrate and the functionalising precursor. Whilst it is perfectly feasible for the powdered substrate and functionalising precursor to be mixed in the fluidised bed prior to the formation of a plasma, i.e. the application of a "wet" coating onto the substrate prior to plasma treatment, this is not generally preferred as it is more likely to lead to physisorption rather than chemisorption. However in the case of a multiple application process one stage could involve a substrate wetting step prior to plasma formation should the need arise.

Any suitable liquid precursor as defined above may also be utilised as a functionalising precursor for functionalising the product formed in step (iii) of the process in accordance with the invention.

When using a functionalising precursor in liquid form and where used solid or liquid/solid slurry, the liquid may be introduced into the reactor and/or brought into contact with the powdered product and/or precursor and where appropriate the excited and/or unstable gas using any suitable means. In a preferred embodiment the liquid precursor is preferably introduced into the reactor (typically a fluidised bed) by way of a liquid spray through an atomiser or nebuliser (hereinafter referred to as an atomiser) as described in the applicants co-pending application WO 02/28548.

The inventors have also found that the introduction of mild basic organic or inorganic catalysts for example amines, pyridine, ammonium hydroxide or dimethylaminopropanol catalyse condensation type reactions involved in multi-step functionalisation of the particles made in accordance with the present invention. The amines may for example, comprise such as tertiary amines, such as trialkyl amines e.g. triethylamine or tripropylamine, secondary amines such as dipropylamine. A chosen catalyst and ammonium hydroxide may be advantageously added where the multi-step process of the type disclosed above involves condensation reactions. The addition of such compounds is seen to both promote condensation and reduce significantly the leaching on non-bonded chemicals.

The average particle size of the particles formed is preferably from 1 nm (nanometer) to 2000 µm (or micron), preferably between 10 nm and 250 µm.

A wide number of possible uses for silicone resins prepared by the method of the present invention are envisaged, these include for example:

Intermediates for modifying viscoelastic properties of siloxane based polymers and elastomers requiring specific properties, in paper coating as release modifiers, and in adhesives, in antifoams and in encapsulant materials for electronic applications; formulated spin-on-glass interlayer dielectrics for use in wafer fabrication (carbon free films); high temperature resistant coatings and carriers for photocopy toners; formulations with organic polymer coatings for thermal stability, weatherability, and surface properties; abrasion resistant coatings (ARC); electronics (IC fabrication, packaging), photonics (waveguide, lenses), traction fluids, tough coating with heat and acid resistance, high performance composites and fire resistant materials applications; and/or flexibility and abrasion resistant auto topcoat in the automotive industry, as a means of providing the silicone benefits to organic systems such as alkyds, epoxy, acrylics, in hot melt sealants, solar encapsulants, and slow curing vinyl resins.

One perceived advantage with respect to the powder made in accordance with the method of the present invention is that the particle sizes of the powder made in accordance with the method of the present invention are generally in the nanometer size range (nanoparticles). Hence, powdered particles produced by the method of the present invention may have various utilities, for example they may be useful in the fields of optoelectronics, photonics, solid-state electronics, flexible electronics, optical devices flat panel displays and solar cells. Silicone resins made by the method of the present invention may be used as high performance composites, fire resistant materials, electrically and/or thermally insulation coatings for example for the microelectronic industry, optically clear coatings and high refractive index coatings for example for the display industry in applications such as televisions, flat panel displays, for the ophthalmic industry in applications such as ophthalmic lenses. Indium-tin mixed oxides are used as electrodes for transparent electrically conductive films and flat panel displays.

The present invention will now be described further based on the following examples and drawings in which:—

Figure 2:
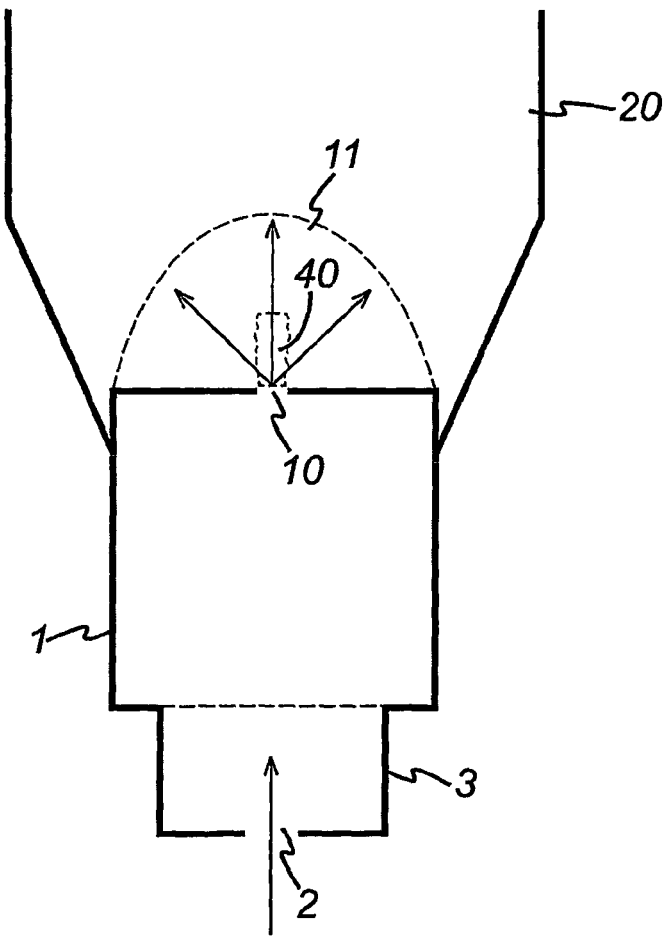

FIG. 1 shows a schematic view of a means for generating excited and/or unstable gas species according to the invention;

FIG. 2 schematically shows a fluidised bed adapted to fit the means as shown in FIG. 1

Figure 3:
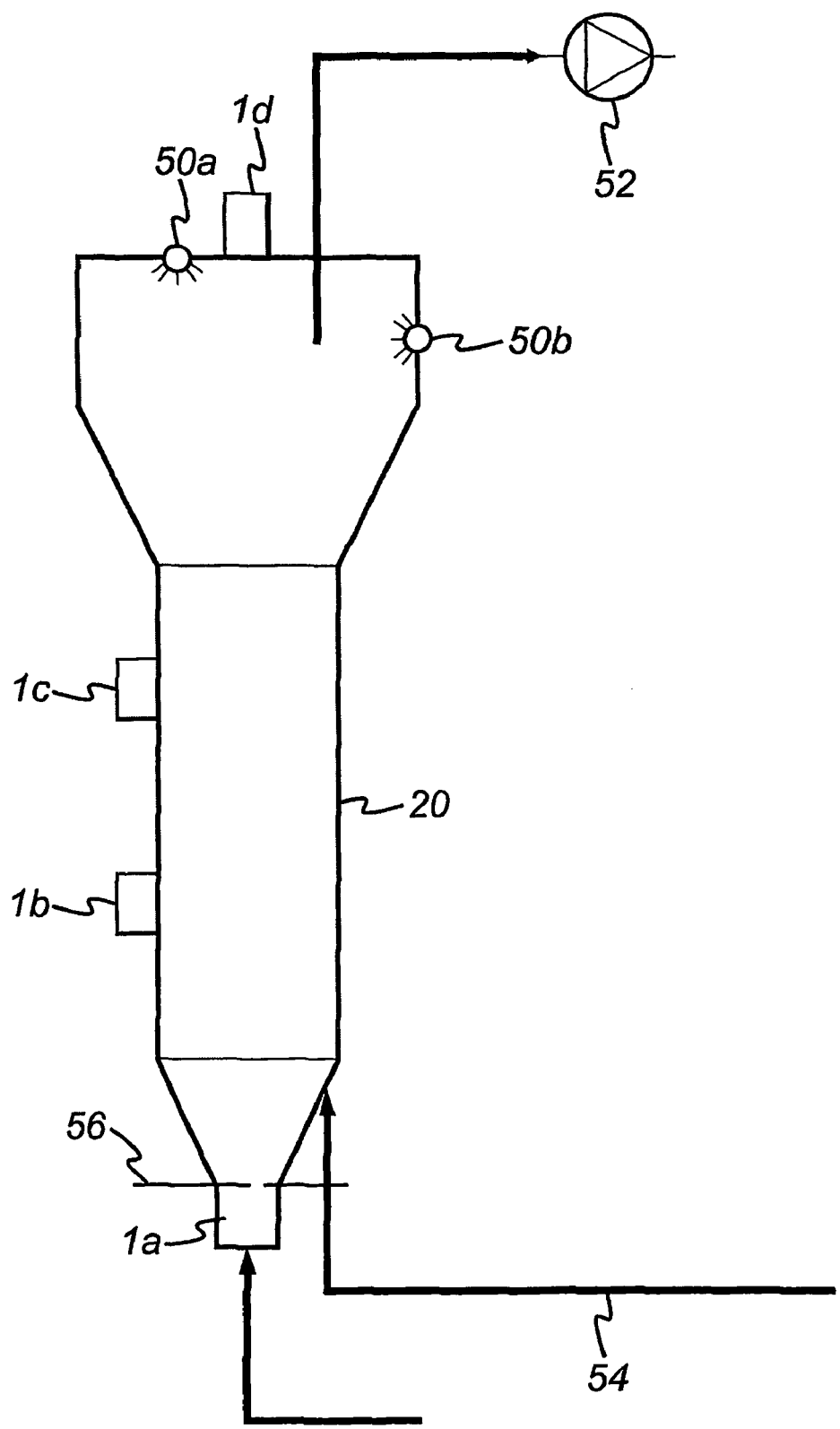

FIG. 3 is a detailed schematic drawing of a fluidised bed in accordance with one embodiment of the present invention.

FIG. 1 shows a means for generating excited and/or unstable gas species 1, having an inlet 2 to a gas homogenisation chamber 3 and an inlet 4 for a gas to pass from homogenisation chamber 3 into electrode configuration 15. Electrode configuration 15 comprises an outer electrode 5, an inner electrode 6 and a layer of dielectric material 7 on the inner electrode 6. Both electrodes 5 and 6 are substantially tubular in construction and are adapted to provide means 1 with a tubular channel 9 there between adapted to receive and guide all gas entering inlet 4 from chamber 3 to an excited and or unstable gas species outlet slit 10. Channel 9 is substantially tubular and preferably has an axial length of up to 1 meter but is typically less than 50 cm long. The distance between the outer surface of dielectric layer 7 and the inner surface of outer electrode 5 is up to 100 mm but is preferably less than 10 mm. Slit 10 extends over the full axial length of the system. In use channel 9 is the region in which plasma is generated as gas passes though means 1.

Electrodes 5 and 6 are connected to a high voltage and high frequency electrical generator 8 operating at a frequency of greater than 15 kHz and delivering a power of in the order of 10 kW.

In use, a gas to be rendered excited and/or unstable is introduced into homogenisation chamber 3 through inlet 2 and subsequently into the electrode configuration 15. A plasma, dielectric barrier discharge and/or corona discharge is generated between electrodes 5 and 6 as the gas passes through the channel 9 resulting in high energy species leaving means 1 via exit 10. The charged species formed within channel 9 remain in channel 9, i.e. between the electrodes but the gas comprising uncharged excited and/or unstable species leaves configuration 15 through outlet 10 and forms a downstream region 11. The gas comprising uncharged excited and/or unstable species interacts with precursor and optionally the powdered material formed in accordance with process of the present invention in downstream region 11. In processes where the powdered product is subsequently functionalised, the voltage applied between the electrodes may be switched off prior to the introduction of the functionalising materials. A plume 40 is visible to the naked eye and is believed to be the result of previously excited and/or unstable species giving off energy when returning to their ground state after having existed in said excited state for a period of time in downstream region 11.

FIG. 2 shows an embodiment of the invention where means 1 in accordance with the invention is adapted for use in a fluidised bed 20, such that gas enters inlet 2 and subsequent to excitation of the type described in relation to FIG. 1 above leaves the configuration through exit slit 10 and enters fluidised bed 20. The flow rate of the gas passing through channel 9/electrode configuration 15 is such that said gas also acts as the fluidising gas in fluidised bed 20. The downstream region is again identified by 11 and the plume is seen at 40 along the exit slit 10.

FIG. 3 is a more detailed schematic drawing of a fluidised bed in accordance with an embodiment of the method in accordance with the present invention including a means of forming excited and/or unstable gas species 1a as described in conjunction with FIGS. 1 and 2. Alternative and/or additional sites for means of forming excited and/or unstable gas species are identified by numerals 1b, 1c and 1d. A means for introducing a liquid precursor 50a is provided at the top of the fluidised bed and an alternative and/or additional means for same is indicated at 50b. Preferably such means 50a and 50b introduce liquid precursor in the form of a liquid spray through an atomiser or nebuliser of the type described in the applicant's co-pending application WO 02/28548. A slide valve 56 is provided immediately above the means of forming excited and/or unstable gas species la, this is intended as a means of preventing powder and precursor from entering electrode configuration 15 (FIG. 1) once the flow of gas through means 1 has been switched off. This valve 56 may be replaced by the mesh as described previously where appropriate. Powdered product and waste gases may be removed from the fluidised bed 20 via gas removal/particle recovery system 52 and are seen to be removable using a pneumatic conveying apparatus at the base of the fluidised bed 54.

In use, the gas to be excited is passed through means 1 (FIG. 1) as described above with respect to FIGS. 1 and 2, at a rate sufficient to provide gas circulation within the fluidised bed to render the fluidised bed operative. Once the fluidised bed is at a suitable state, the voltage across the electrodes is applied resulting in the generation of a plasma or the like. The velocity of the gas travelling through means 1 results in charged particles being retained in channel 9, whereas the non-charged excited and/or unstable particles pass through exit 10 and into fluidised bed 20 to form a downstream region. Once the downstream region has equilibrated, the precursor(s) is/are introduced into the downstream region via 54 and are activated in the downstream region by the excited and/or unstable particles produced by the plasma. Powdered product is gradually formed and may be visible to operatives. Subsequent to the preparation of the powdered product, the applied voltage is generally switched off and the product is removed from the reactor by way of means 52 or 54.

In cases where the powdered product is to be functionalised subsequent to preparation, typically the powdered product will not be removed but will be suitably treated by means of the introduction of a reactive excited and/or unstable gas, such as an oxidising gas (air/oxygen), a reducing gas (Nitrogen), or a functionalising precursor. In the case of a functionalising precursor, said functionalising precursor may then be added whilst the plasma in means 1 is still functioning however, preferably the voltage across the electrodes is switched off prior to the introduction of the functionalising materials, i.e. substantially all the excited and/or unstable species forming the downstream region have returned to there unexcited state or been dispersed so that the functionalising material is not excited. In both options, the gas flow is maintained at a substantially constant velocity to ensure the functioning of the fluidised bed. The option to be taken really needs to be determined dependent on the substrate and functionalising particles being utilised. In the case when only a single functionalising step occurs the functionalised particles may then be removed from the fluidised bed. The process for removal of the functionalised particles is that the gas flow through means 1 is switched off and substantially simultaneously the slide valve is actuated to prevent particles from passing back into means 1 under gravity. The functionalised particles may then be removed from the fluidised bed by for example pneumatic conveying via line 54.

In the event that a multi-step functionalisation process is being utilised preferably a predetermined amount of functionalising precursor material is introduced for a set amount of substrate (i.e. the powdered product) already present in the fluidised bed and the mixture is mixed within the fluidised bed for a predetermined period of time. Where appropriate a sample of the resulting functionalised substrate may be removed from the system for analysis but preferably the process is automated such that, after a set period of mixing with the first functionalising material, an alternative gas source could be used e.g. an oxidising or reducing gas as described above or a further coating/functionalising material may be introduced into the fluidised bed to interact with the initially functionalised material. A similar process may then be followed for each different chemical change/coating/functionalising step required until the appropriately functionalised end product is formed. The end product is then be extracted via for example line 54 by pneumatic conveying or any other suitable means.

As indicated in FIG. 3 whilst the above description has merely referred to a single introduction means and plasma source etc., multiple plasma sources and functionalising material introduction means may be utilised and where appropriate further gas inlets may be provided to ensure the functionability of the fluidised bed.

In the following examples an M unit is intended to mean $Me_3SiO_{1/2}$, a $D^H$ unit means $MeHSiO_{2/2}$, a T units mean $MeSiO_{3/2}$, a $T^H$ units means $HSiO_{3/2}$ and a Q group means $SiO_{4/2}$.

EXAMPLE 1

A fluidised bed reactor was constructed with a 200 mm square section in 4 mm thick polycarbonate. The reactor consists of a straight section approximately 1 m in height together with an expanded head of square section 300 mm, also approximately 1 m in height. The base tapers to a rectangular slit of cross section approx 150 mm×30 mm. To avoid material build-up on surfaces, vertical angles are limited to no less than 20 degrees from vertical. (i.e. max cone angle 40 degrees at the base). The polycarbonate was readily fused together by means of a hot air gun.

The rectangular slit was then fitted with a 4 mm polycarbonate flange adapted to be suitable with respect to the dimensions of plasma generating device utilised. The atmospheric pressure glow discharge plasma generating device was then attached to the base of the reactor together with a gasket for sealing. A slide valve was also incorporated into the assembly to enable closure of the base of the reactor above the plasma device and to enable shutdown without contamination of the plasma device.

Liquids are sprayed into the unit with one or more nebulising devices capable of generating liquid droplets at about 1-10 μm size (eg Cirrus™ Nebulizer code 1501 sold by Intersurgical). Depending on the liquid in question the carrier gas can be air or an inert gas (e.g. nitrogen). Typical entry point for the nebulised liquid stream is at the start of the square section or approx 200 mm away from the plasma head. In use, the droplets enter the region inhabited by excited species generated by the plasma generating assembly and the powdered substrate and the powdered substrate is functionalised due to their interactions.

Solids recovery was achieved with an external cyclone designed for inlet velocities of approximately 50 ft per second (15.24 $ms^{-1}$) or contained within the fluidised bed reactor by a filter fitted at the top of the reactor. Solids were returned by suction with a venturi nozzle operating at about 20 liters per minute compressed air (or inert gas) enabling solids return to the reactor from the base of the cyclone. The venturi nozzle used had an orifice diameter of 0.9 mm and an air/gas supply pressure of 6 bar ($6 \times 10^5$ $Nm^{-2}$).

Liquid polymethylhydrogensiloxane having a degree of polymerisation (dp) of 23 ($M_{0.11}D^H{}_{0.89}$) was continuously fed via a nebulisation nozzle into the fluidised bed plasma reactor and was fluidised in contact with the excited species generated by the plasma assembly (hereafter referred to as "atmospheric plasma post-discharge" for a period of 35 minutes in the presence of a reactive gas mixture comprising 400 ppm oxygen ($O_2$) in 250 l/min of nitrogen ($N_2$). The power delivered to the plasma source of the post discharge atmospheric plasma is 2,200 W.

A white powder was deposited onto the surface of a polycarbonate support utilised to collect the resulting powder and/or discrete gel particle product. The white powder was recovered and analysed. The powder was found to have a general formula of $M_{0.04}D_{0.01}D^H{}_{0.68}T_{0.21}T^H{}_{<0.01}Q_{0.06}$ as determined by $^{29}$Si MAS NMR spectroscopy (OH mol %= 13%). Scanning electron microscopy showed the formation of initial particles in the range of few tens of nm that aggregated into larger particles in the range of few tens of microns. The contact angle of a 1 µl water droplet on the resin deposited onto polycarbonate is >150° showing the resin powder to be superhydrophobic.

EXAMPLE 2

Liquid polymethylhydrosiloxane having a degree of polymerisation (dp) of 22.6 ($M_{0.11}D^H{}_{0.89}$) was continuously fed via a nebulisation nozzle into the fluidised bed plasma reactor as described in Example 1 and was fluidised in contact with the downstream region of atmospheric plasma post-discharge for a period of 35 minutes. The gas used to provide the excited and/or unstable species was air introduced at a rate of 250 l/min. The power delivered to the plasma source was 2,200 W.

A white powder was deposited onto the surface of a polycarbonate support utilised to collect the resulting powder and/or discrete gel particle product. The white powder was again recovered and analysed. The composition of the obtained resin was determined as $M_{0.02}D_{<0.02}D^H{}_{0.04}T_{0.60}Q_{0.34}$ by means of $^{29}$Si MAS NMR spectroscopy (OH mol %=28%).

The contact angle of a 1 µl water droplet on the resin deposited onto polycarbonate was >157° showing that the resin powder was superhydrophobic. Particles Size analysis of the white organosilicone resin powder was undertaken using a Coulter LS 230 Laser Particles Size Analyser (from 0.04 to 2000 µm), in isopropyl alcohol (IPA), using the Mie theory and the glass optical model calculation for a fluid corresponding to IPA and sample corresponding to glass (real=1.5 Refractive Index (RI), imaginary RI=0). The particle size distribution of this organosilicone resin is bimodal from 40 to 600 nm and from 1 µm to 40 µm, both centred at below 300 nm and below 4 µm. The overall particle size distribution is centred (50% in volume) at a particle diameter of below 4 µm.

EXAMPLE 3

A 1:1.2 mixture of 1,3,5,7-tetramethylcyclotetrasiloxane in 1,3,5,7,9-pentamethylcyclo pentasiloxane was continuously fed via a nebulisation nozzle into the fluidised bed plasma reactor as described in Example 1 and was fluidised in contact with the downstream region of atmospheric plasma post-discharge for a period of 35 minutes. The gas used to provide the excited and/or unstable species was 400 ppm oxygen ($O_2$) in 250 l/min of nitrogen ($N_2$). The power of the post discharge atmospheric plasma is 2,200 W.

A white powder was deposited onto the surface of a polycarbonate support utilised to collect the resulting powder and/or discrete gel particle product. The white powder was again recovered and analysed. The composition of the resulting resin was found to be $M_{0.02}D_{0.03}D^H{}_{0.27}T_{0.43}T^H{}_{0.03}Q_{0.22}$ as determined by $^{29}$Si MAS NMR spectroscopy (OH mol %=17%). The contact angle of water on the resin deposited onto polycarbonate was >150°. Particles Size analysis of the white organosilicone resin powder was undertaken using a Coulter LS 230 Laser Particles Size Analyser (from 0.04 to 2000 µm), in IPA, using the Mie theory and the glass optical model calculation for a fluid corresponding to IPA and sample corresponding to glass (real 1.5 RI, imaginary 0). The particle size distribution of this organosilicone resin is bimodal from 40 to 600 nm and from 1 µm to 40 µm, both centred at below 200 nm and below 10 µm. The overall particle size distribution is centred (50% in volume) at a particle diameter of below 6 µm.

The invention claimed is:

1. A method of forming a powder and/or discrete gel particles of a compound selected from the group of a metallic oxide, a metalloid oxide, a mixed oxide, an organometallic oxide, an organometalloid oxide, an organomixed oxide resin, and/or an organic resin from one or more respective organometallic precursor(s), organometalloid precursor(s) and/or organic precursors and mixtures thereof; comprising the steps of:
   i) passing a gas into a means for forming excited and/or unstable gas species;
   ii) treating said gas such that upon leaving said means the gas comprises excited and/or unstable gas species which are substantially free of electrical charges at a temperature of between 10° C. and 500° C.;
   iii) introducing a gaseous and/or liquid precursor which has not been subjected to steps (i) and (ii) into said excited and unstable gas species in a downstream region external to the means for forming excited and/or unstable gas, interaction between said precursor and said excited and unstable gas species resulting in the formation of a powder and/or discrete gelled particles; and
   iv) collecting resulting powder and/or discrete gelled particles,
wherein the gaseous and/or liquid precursor is an organic compound or a mixture of organic compounds or a mixture of organic and organosilicon compounds.

2. The method in accordance with claim 1 wherein the means to generate excited and/or unstable gas species is an electrical discharge apparatus.

3. The method in accordance with claim 1 wherein the liquid precursor is treated by the excited and/or unstable gas species resulting therefrom, in a container.

4. The method in accordance with claim 3 wherein the container is a fluidised or circulating bed.

5. The method in accordance with claim 4 wherein the gas comprising excited and/or unstable gas species is utilised as the gas in the fluidised or circulating bed for suspending powders, discrete gel particles and/or droplets of liquid.

6. The method in accordance with claim 1 wherein the liquid and/or gas precursor is in the form of a liquid compound, a solution of a high viscosity liquid or solid compound in either a liquid carrier or a liquid co-reactive and/or a molten solid.

7. The method in accordance with claim 6 wherein the liquid precursor is introduced into the excited and/or unstable gas species in the form of an atomised liquid.

8. The method in accordance with claim 7 wherein the atomised liquid is introduced into the excited and/or unstable gas species by direct injection.

9. The method in accordance with claim 1 wherein the liquid and/or gas precursor is an organometallic compound of titanium, zirconium, iron, aluminium, indium and tin or mixtures containing one or more thereof.

10. The method in accordance with claim 1 herein the liquid and/or gas precursor is an organometalloid compound of germanium or silicon.

11. The method in accordance with claim 1 wherein the organosilane is a functionalised silane containing one or more functional groups selected from the following alkenyl, aryl, H, OH, amino groups, aldehyde groups, alkyl halide groups, alkyne groups, amido groups, carbamate groups, urethane groups, organic salts, carboxylic acid groups and their derivatives, heterorganic groups containing boron atoms and/or phosphorus atoms, mercapto and sulphido groups; grafted or covalently bonded amino acids and/or their derivatives, grafted or covalently bonded proteins, enzymes and DNA.

12. The method in accordance with claim 10 wherein the organometalloid compound is an organopolysiloxane having a viscosity of from 0.65 to 1000 mPa·s.

13. The method in accordance with claim 1 wherein subsequent to preparation, said powder and/or discrete gelled particles are treated on one or more occasions with an excited and/or unstable gas species and/or one or more functionalising precursors.

14. A powder and/or discrete gel particles of an organic resin obtained in accordance with the method of claim 1.

* * * * *